United States Patent
Blanz et al.

[11] Patent Number: 6,155,050
[45] Date of Patent: Dec. 5, 2000

[54] SYSTEM AND METHOD FOR PROTECTING A TURBOCHARGER IN THE EVENT OF A WASTEGATE FAILURE

[76] Inventors: Michael P. Blanz, 3387 Briar Dr., Columbus, Ind. 47203; Richard T. White, 2903 Carr Hill Rd., Columbus, Ind. 47201; Randall B. Fischer, 2310 Jolinda Ct., Columbus, Ind. 47203; Paul Daniel Borisuk, 8895 Old Nashville Rd., Nashville, Ind. 47448; Jeremy J. Worm, 59989 Whitman North Apt. F, Washington Twp., Mich. 48094; William P. Richardson, 1371 Nelson Ridge Rd.; Yong Shu, 1152 Kevin Dr., Apt. 2B, both of Columbus, Ind. 47201; Kyle Lee Edwards, 2121 W. SR 144, Franklin, Ind. 46131

[21] Appl. No.: 09/323,489

[22] Filed: Jun. 1, 1999

[51] Int. Cl.⁷ ............................ F02B 39/16; F02D 23/02; F02D 41/22
[52] U.S. Cl. .................................................. 60/603
[58] Field of Search ..................... 60/601, 603, 605.1; 123/198 E, 198 D, 333, 478

[56] References Cited

U.S. PATENT DOCUMENTS

| | | |
|---|---|---|
| 4,044,560 | 8/1977 | Dorsch et al. ............................ 60/601 |
| 4,470,390 | 9/1984 | Omori et al. ........................... 60/605.1 |
| 4,492,203 | 1/1985 | Yutaka ..................................... 60/601 |
| 4,594,668 | 6/1986 | Fujawa et al. . |
| 4,603,552 | 8/1986 | Kido ...................................... 60/605.1 |
| 4,604,701 | 8/1986 | Fujawa et al. . |
| 4,633,670 | 1/1987 | Iwasa ...................................... 60/603 |
| 4,656,834 | 4/1987 | Elpern . |
| 4,685,435 | 8/1987 | Denz et al. .............................. 60/603 |
| 4,953,110 | 8/1990 | Chartrand . |
| 5,159,815 | 11/1992 | Schlamadinger . |
| 5,199,260 | 4/1993 | Iwick . |
| 5,447,031 | 9/1995 | Betts et al. . |
| 5,502,966 | 4/1996 | Unland et al. ........................... 60/603 |
| 5,551,236 | 9/1996 | Zimmer et al. . |
| 5,605,044 | 2/1997 | Zimmer et al. . |
| 5,755,101 | 5/1998 | Free et al. . |
| 5,829,254 | 11/1998 | Hayashi et al. . |
| 5,913,301 | 6/1999 | Kienle et al. ............................ 60/603 |

FOREIGN PATENT DOCUMENTS

| | | | |
|---|---|---|---|
| 57-193737 | 11/1982 | Japan ...................................... 60/603 |
| 61-265331 | 11/1986 | Japan ...................................... 60/603 |
| 64-41629 | 2/1989 | Japan ...................................... 60/603 |

*Primary Examiner*—Michael Koczo

[57] ABSTRACT

An engine control system for protecting a turbocharger of an internal combustion engine from an overspeed condition occurring as a result of a failure of the turbocharger wastegate device. In one embodiment of the invention, sensors provide signals for engine speed, ambient pressure and boost pressure between the turbocharger and the engine intake. Correction factors are added to the boost pressure and ambient pressure signals, and a turbocharger pressure ratio is calculated from these signals. A reduced fueling table maps turbocharger pressure ratio and engine speed to reduced fueling signal values. An engine control computer utilizes a nominal fueling table that maps engine speed and boost pressure to nominal fueling signal values. The control computer also includes a decision module that selects the lesser of the nominal fueling signal values and the reduced fueling signal values and provides the selected value to the engine fueling system. In the event of a wastegate failure, the turbocharger wheelspeed will increase, followed by an increase in boost pressure. However, not all boost pressure increases are detrimental to the turbocharger (i.e., lead to excessive speed), so the present invention evaluates the turbocharger pressure ratio to determine when an excessive speed condition exists. If such a condition exists, the engine control computer selects the lesser fueling signal value from the reduced fueling table to decrease fueling to the engine, and ultimately to decrease the engine speed and load. The decreased engine speed and load reduces the exhaust gas mass flow rate, which reduces the turbocharger rotational speed to an acceptable level.

10 Claims, 3 Drawing Sheets

| PRESSURE RATIO – r | | | | | | | | | | | |
|---|---|---|---|---|---|---|---|---|---|---|---|
| ENGINE SPEED = N | 1.0 | 1.33 | 1.66 | 2.0 | 2.33 | 2.66 | 3.0 | 3.33 | 3.66 | 4.0 | 4.33 |
| 700 | | | | | | | | | | | $F_1$ |
| 900 | | | | | | | | | | | $F_2$ |
| 1100 | | | | | | | | | | $F_3$ | $F_4$ |
| 1300 | | | | | | | | | | $F_5$ | $F_6$ |
| 1500 | | | | | | | | | $F_7$ | $F_8$ | $F_9$ | $F_{10}$ |
| 1700 | | | | | | | | | $F_{11}$ | $F_{12}$ | $F_{13}$ | $F_{14}$ |
| 1900 | | | | | | | | | $F_{15}$ | $F_{16}$ | $F_{17}$ | $F_{18}$ |
| 2100 | | | | | | | | $F_{19}$ | $F_{20}$ | $F_{21}$ | $F_{22}$ | $F_{23}$ |
| 2300 | | | | | | | | $F_{24}$ | $F_{25}$ | $F_{26}$ | $F_{27}$ | $F_{28}$ |
| 2500 | | | | | | $F_{29}$ | $F_{30}$ | $F_{31}$ | $F_{32}$ | $F_{33}$ | $F_{34}$ | $F_{35}$ |
| 2700 | | | | | | $F_{36}$ | $F_{37}$ | $F_{38}$ | $F_{39}$ | $F_{40}$ | $F_{41}$ | $F_{42}$ |

*Fig. 5*

SYSTEM AND METHOD FOR PROTECTING A TURBOCHARGER IN THE EVENT OF A WASTEGATE FAILURE

BACKGROUND OF THE INVENTION

The present invention relates generally to systems and methods for protecting a turbocharger against a shaft overspeed condition. More specifically, the invention concerns using engine fueling commands to prevent turbocharger overspeed.

Internal combustion engines having turbocharger units attached thereto are commonplace in the automotive, heavy-duty truck and industrial vehicle industries. Such turbocharger units are generally responsive to at least some of the engine exhaust gas to increase air pressure in an intake manifold (i.e., boost pressure) and correspondingly increase engine performance.

One engine turbocharger system 10 is depicted in FIG. 1. The system 10 includes an air intake manifold 11 supplying air to each engine cylinder C. The gaseous products of combustion are discharged through an exhaust manifold 12. The engine includes a control computer or engine control module (ECM) 15 that receives signals 16 from various sensors throughout the engine and vehicle. The ECM 15 includes software routines that use these signals to control engine functional components.

The system 10 further includes a turbocharger 20 associated with the engine and coupled between the intake manifold 11 and the exhaust manifold 12. The turbocharger 20 can be of known construction in which fresh air passes through an inlet 21 to a compressor 22 that provides a compressed charge of air to the intake manifold 11. The compressor 22 is connected to a turbine 24 by a turbocharger shaft 25. Exhaust gas is fed through the exhaust manifold 12 to drive the turbine 24 for eventual discharge through outlet 26.

It is known that for normal turbocharger operation the speed of the turbocharger is primarily a function of the engine speed, load and the ambient air pressure. Increased engine power increases the mass flow rate of exhaust gas through the manifold 12, which causes the turbine 24 to rotate faster. The turbocharger shaft 25 directly links the compressor 22 to the turbine 24 so the compressor speed also increases, leading to greater compression of the incoming charge. The compressed air charge is fed to the engine cylinder C through the intake manifold 11. The increase in pressure of the ambient air produced by the compressor 22 is the boost pressure of the turbocharger. The pressure ratio of the turbocharger is the ratio of the boost pressure to the ambient pressure of the air supplied at the turbocharger inlet 21.

Under certain operating conditions, it is desirable to limit the rotational speed of the turbocharger 20. Thus, the system 10 can include a bypass conduit 30 that is connected between the engine exhaust manifold 12 and the turbocharger exhaust outlet 26, essentially bypassing the turbine 24. A variable opening valve 31 controls the amount of exhaust gas passing from manifold 12 to the bypass conduit 30. When the valve 31 is closed, all engine exhaust is supplied to the turbine. When the valve is fully open, exhaust gas is fed to the turbine and to the bypass conduit in proportion to the flow areas of the two paths.

In one type of turbocharger system, the wastegate valve 31 is connected to an actuator 33 by a linkage 34. The actuator 33 is fluidly connected to the intake manifold 11 by an actuator conduit 36 and electrically connected to the engine controller 15 by signal line 35. The wastegate actuator 33 can be of the type shown and described in U.S. Pat. No. 5,755,101, which description is incorporated herein by reference. As disclosed more fully in the '101 patent, the actuator includes a diaphragm connected to the linkage 34, which is modulated in response to the pressure signal provided through actuator conduit 36. In addition, the actuator 33 can include an electrical coil that is energized or de-energized in response to control signals 35 generated by the ECM 15. The actuator 33, and ultimately the wastegate valve 31, can control the speed and boost pressure of the turbocharger 20.

Excessive turbocharger speed can lead to failures of the shaft 35, or to rupture or dislodgment of turbine or compressor blades. Consequently, the wastegate 30,31 is typically calibrated to open at a predetermined boost pressure on conduit 36 to limit the turbocharger shaft speed independent of overall engine speed. In the event of a wastegate failure, a potential exists for the turbocharger wheelspeed to increase above design limits. Turbocharger overspeed is not only detrimental to the turbocharger unit itself, it can also lead to excessive cylinder pressure that causes progressive damage to the engine. Wastegate failures can occur at any point in the system, such as the linkage 31, actuator 33, pressure conduit 36 or ECM control signal line 35.

As yet, no turbocharger and wastegate system, particularly those used with electronic fuel systems, has been provided that accounts for possible wastegate failures. There is a need for a system and method that can protect a turbocharged engine from damage or failure that has followed wastegate failures.

SUMMARY OF THE INVENTION

In order to address this need, the present invention contemplates a system and method for protecting a turbocharger in the event of a wastegate failure. More particularly, the invention controls the engine fueling commands under conditions indicative of a potential turbocharger overspeed. In a preferred embodiment, a fueling map is provided for use by an engine control computer. The fueling map is preferably in the form of a three-dimensional table in which a fueling command value is provided as a function of engine speed and turbocharger pressure ratio.

The engine fueling is controlled by signals from a control computer. Under normal operating conditions, nominal fueling signals are extracted from a table mapping engine speed and boost pressure to nominal fueling values. Under certain circumstances, such as a failure of the turbocharger wastegate device, engine exhaust during nominal fueling can lead to excessive turbocharger speeds. Thus, in one embodiment of the invention, sensors provide signals for engine speed, ambient pressure and boost pressure between the turbocharger and the engine intake. Correction factors are added to the boost pressure and ambient pressure signals, and a turbocharger pressure ratio is calculated from these signals.

The invention then contemplates a reduced fueling table that maps turbocharger pressure ratio and engine speed to reduced fueling signal values. This table only provides reduced fueling signals under engine speed and pressure ratio combinations that will lead to a turbocharger overspeed condition. The engine control computer preferably includes a decision module that selects the lesser of the nominal fueling signal values and the reduced fueling signal values and provides the selected value to the engine fueling system. The selected lesser fueling signal value from the reduced fueling table decreases fueling to the engine, and ultimately decreases the engine speed and load. The decreased engine power reduces the exhaust gas mass flow rate, which reduces the turbocharger rotational speed to an acceptable level.

It is one object of the invention to provide a system and method that protects a turbocharger from experiencing excessive rotational speeds. A further object is achieved by features of the invention that, in effect, discriminate among engine operating conditions to avoid providing reduced fueling commands when not necessary to protect the turbocharger.

Other objects and particular benefits of the invention will be readily discerned from the following written description and accompanying figures.

DESCRIPTION OF THE FIGURES

FIG. 5 is a table of fueling commands implemented by an engine controller according to one embodiment of the invention.

DESCRIPTION OF THE PREFERRED EMBODIMENT

Figure 1:
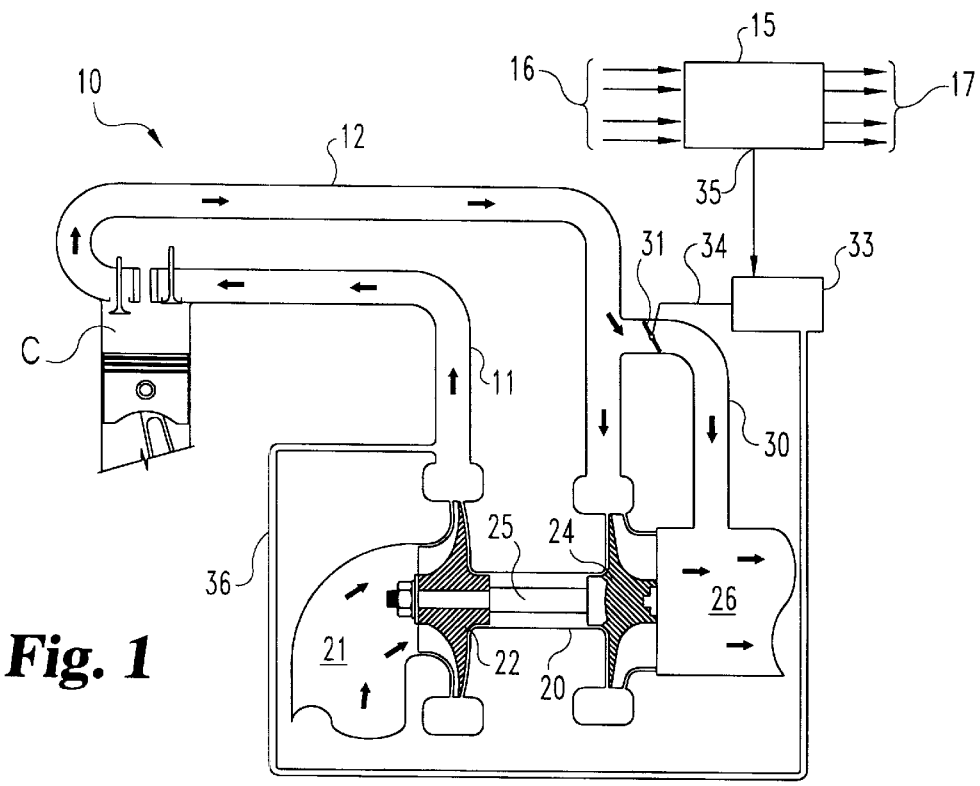
FIG. 1 is a schematic representation of an engine turbocharger with a wastegate system.

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 2:
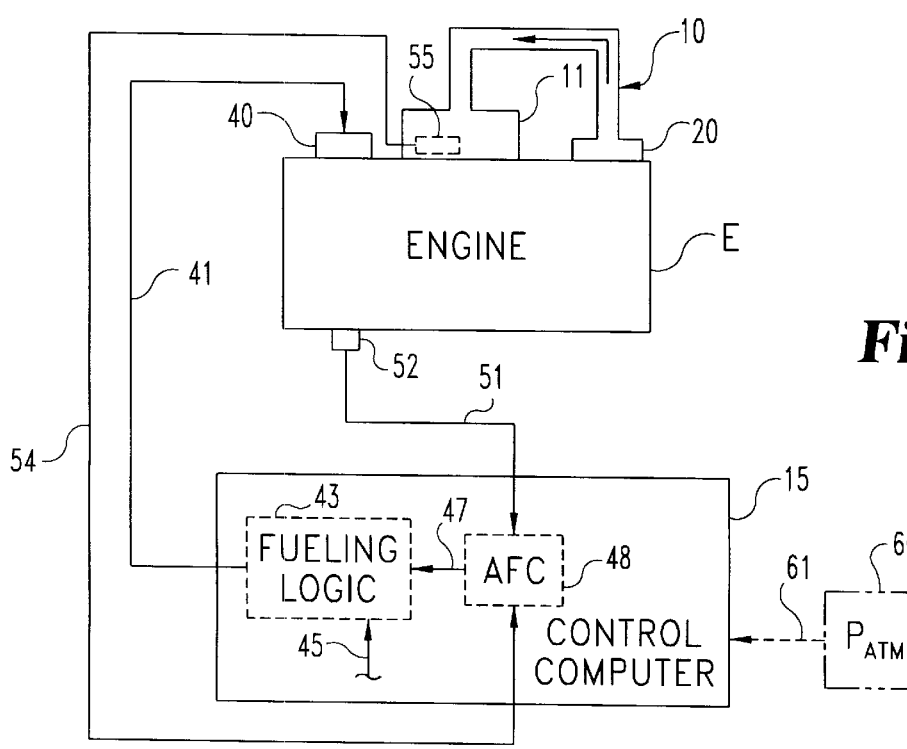
FIG. 2 is a schematic representation of a turbocharged engine and engine controller operable to implement engine fueling commands.

The present invention contemplates a system and method for protecting a turbocharged engine from problems associated with a failure of the turbocharger wastegate device. In the preferred embodiment, the turbocharger system depicted in FIG. 1 is mounted to an engine E, as illustrated in FIG. 2. As described above, the turbocharger 20 receives exhaust gas from the engine E and provides compressed air to the intake manifold 11.

The operation of the engine E is governed by a control computer or ECM 15, as described above. The ECM 15 generates control signals on line 41 connected to the engine fueling system 40. The fueling system 40 introduces a quantity of liquid fuel into the engine cylinders in proportion to the quantity of air supplied to the intake manifold. The ECM 15 includes a fueling logic module 43 that determines an optimum air/fuel ratio for the engine operating condition.

The amount of fuel to be injected into the engine cylinders is a function of the engine speed and the charge of air. Thus, the system includes an engine speed sensor 52 connected to the engine E that provides a speed signal "N" on input line 51 to the ECM 15. The speed sensor can be of any type capable of providing a signal indicative of the rotational speed of the engine. In a typical engine, the quantity of air charge supplied to the engine is proportional to the gauge pressure of the air in the intake manifold. Thus, the engine system contemplates a pressure sensor 55 disposed between the turbocharger 20 and the engine cylinders. This sensor 55 measures the turbocharger boost pressure and provides a signal on line 54 to the ECM 15.

In a preferred embodiment of the invention, the ECM 15 includes an air-fuel control (AFC) module 48. This AFC module 48 provides an AFC fueling signal 47, based on the engine speed signal provided thereto via signal path 51 and the boost pressure signal provided thereto via signal path 54, to fueling logic module 43. The logic module also receives a number of other signals at inputs 45 corresponding to a number of other fueling strategies implemented by other modules associated with the ECM 15. For example, fueling strategy signals may be provided by one or more engine speed governors, a maximum vehicle speed limiter, and the like.

In any case, the fueling logic module 43 is typically operable in accordance with a "least wins" or MIN logic strategy. With this approach, the fueling signal provided to fueling system 40 on signal path 41 is the minimum fueling value provided to module 43 via the various signal paths 47 and 45. In other words, in most engine control systems, as in the preferred embodiment of the invention, the fueling command yielding the lowest fueling amount to the engine E takes precedence over all other fueling strategies. With this approach, the output of the engine E will not be higher than conditions that the ECM 15 permits.

In many prior art systems, the AFC module 48 can include a memory unit (not shown) having a predetermined fueling strategy stored therein. One known form of the fueling strategy is implemented as a stored look-up table 57 that includes a number, n, of columns corresponding to discrete boost pressure values $B_1-B_n$, and a number, m, of rows corresponding to engine speed values $N_1-N_m$. Table 57 is operable to provide an appropriate fueling value $F_{xy}$ (typically in units of mm$^3$/stroke) based on current values of turbocharger boost and engine speed.

In accordance with one known embodiment of table 57, the fueling values $F_{xy}$ increase with increasing engine speed for each boost pressure column between $B_1$ and $B_k$ where 2<k<n, and remain constant within each boost pressure column between $B_k$ and $B_n$. In this manner, fueling can be limited to provide a minimum air-to-fuel ratio (A/F) for optimizing a tradeoff between turbocharger lag and production of exhaust emissions such as black smoke and other unwanted emissions.

This fueling strategy is acceptable under a normal range of engine operating conditions and circumstances to control the mass flow rate of exhaust gas into the turbocharger. Under certain conditions, however, the nominal fueling strategy may lead to excessive boost pressures or turbocharger overspeed conditions. In order to address these conditions, most turbocharged engines have relied upon the operation of the wastegate valve 31 and bypass 30 to dump off some of the exhaust gas fed to the turbocharger turbine 24. When the wastegate is functioning properly, this approach adequately protects the engine and turbocharger. A healthy wastegate allows the AFC module 48 and fueling logic module 43 to operate according to a usual protocol to provide fueling commands to the fueling system 40.

This system runs into difficulties when the wastegate gas bypass feature is compromised, such as by a malfunction or failure of the wastegate system. When this event occurs, the prophylactic effect of the wastegate is lost and an engine operating under typical fueling protocols can drive the turbocharger beyond its rated speed. The present invention contemplates a system and method for altering the engine fueling commands in the event of a failure of the wastegate gas bypass. Direct diagnosis of a wastegate problem is difficult due to the number of potential failure points (e.g., valve, linkage, controller, etc.). Thus, the present invention relies upon indirect evidence of a wastegate failure, in particular the pressure ratio across the turbocharger. The pressure ratio, r, is the ratio of the outlet pressure to the inlet air pressure, or the pressure of the compressed air charge in the intake manifold 11 to the ambient pressure of fresh air introduced into the turbocharger through the fresh air inlet 21.

In order to determine the pressure ratio, the invention contemplates a pressure sensor 55 disposed within the intake manifold 11 downstream of the turbocharger to determine the boost pressure, $P_{boost}$. In addition, a device 60 is included that ascertains the ambient air pressure, $P_{atm}$. The boost pressure sensor 55 provides a signal to the ECM 15 on signal line 54, while the ambient pressure sensor generates a signal that is supplied to the ECM on line 61.

In accordance with the invention, software within the ECM 15, and most preferably the AFC module 48, utilize these pressure signals to provide a turbocharger protection function. In one embodiment, the software can execute a series of commands following the flowchart shown in FIG. 4. The routine is commenced at the initial or start step 60 in a variety of ways. For example, the routine can preferably operate as a continuously executing background routine. In the ensuing steps 62 and 64, the two sensors are polled for $P_{atm}$ and $P_{boost}$. Typically, the sensors would generate an analog signal indicative of the magnitude of the pressure, which signals are then conditioned through an analog-to-digital converter for use by software routines within the ECM 15.

In one embodiment, the turbocharger boost pressure is a gauge pressure. Thus, the gauge boost pressure is essentially zero when the turbocharger is not operating and ambient pressure air is admitted to the engine cylinders. An absolute boost pressure can be obtained by adding the ambient pressure ($P_{atm}$) to the gauge boost pressure. Alternatively, the boost pressure sensor 55 can provide an absolute pressure value. For the purposes of the following discussion, the value $P_{boost}$ is the absolute boost pressure.

Once the pressures on opposite sides of the turbocharger have been read, the pressure ratio, r, can be determined in step 66. In one embodiment, the pressure ratio can be simply the ratio $P_{boost}/P_{atm}$. However, since this simple approach can be subject to significant error, the present invention contemplates the following calculation for pressure ratio:

$$r=(P_{boost}+P_{loss}+P_{overshoot})/(P_{atm}+P_{inlet})$$

In this equation, $P_{loss}$ is a gauge loss in boost pressure between the compressor and the intake manifold. The value $P_{overshoot}$ is a predetermined value above a nominal absolute boost pressure at which engine derating should occur for a turbocharged engine with a properly functioning wastegate. This value can be regarded as a correction factor to account for a properly functioning engine that is producing boost levels at the high side of the turbocharger tolerance. Absent this correction factor, a risk exists that the engine would derated from maximum power even though the turbocharger has not exceeded its wheelspeed limit. In one specific embodiment, this correction factor $P_{overshoot}$ is 4.0 in.Hg. Alternatively, the correction factor can be a function of engine speed and power rating, so that the magnitude of $P_{overshoot}$ can be larger at higher engine speeds and power levels. As a further alternative, the correction factor can be derived from a statistical analysis of turbocharger boost levels at engine speeds, so the factor can correspond to a $3\sigma$ pressure value. The value $P_{inlet}$ is the gauge pressure loss at the compressor inlet. The values for $P_{loss}$ and $P_{inlet}$ can be empirically obtained and may vary from engine to engine.

In accordance with the present invention, calculated pressure ratio value r can be used as an indicator of a wastegate system failure. In one approach, the pressure ratio can be compared to a limit value $r_{lim}$ that is based upon the limiting wheelspeed of the turbocharger. However, under certain engine operating conditions, high boost pressures and turbocharger pressure ratios may be acceptable, when those same values would otherwise indicate a wastegate failure under other operating conditions. For example, at high engine speed and power conditions, the pressure ratio r may exceed 5.0, particularly where the engine is operating at higher altitudes. At lower speeds, a pressure ratio value above 3.0 can indicate a turbocharger/wastegate problem.

The present invention addresses this difficulty by evaluating the turbocharger pressure ratio in relation to the engine speed. In step 68, the engine speed (r.p.m.) is obtained from a speed sensor 52. In the next step 70, the engine speed value N and turbocharger pressure ratio value r are used to obtain a fueling value. In one feature of the invention, the AFC module 48 stores a fueling table, such as the table 80 of FIG. 5. The table 80 provides a fueling value $F_i$ (preferably mm.$^3$/stroke) as a function of the pressure ratio r and engine speed N. The table can effectively be divided into two sections. One section 82 corresponds to a turbocharged engine with a normally functioning wastegate. In other words, a certain range of r and N values are acceptable and are not indicative of a wastegate failure. For this range of values, the normal fueling protocol is acceptable. In one embodiment of the table 80, fueling values in the first section 82 can be nulled out or otherwise valued so no fueling value will be extracted.

The table 80 includes a second section 84 that corresponds to an unacceptable range of r and N values. This section 84 corresponds to a wastegate failure condition, or more specifically to a condition in which the turbocharger is susceptible to a wheelspeed that exceeds the structural limits of the turbocharger. Thus, section 84 of the table 80 includes a plurality of fueling values, such as values $F_1$–$F_{42}$, that represent reduced fueling values relative to fueling values for a particular engine speed and boost pressure. The appropriate fueling value from table 80 is provided to the fueling logic module 43 in step 72. Under the "least wins" protocol, the reduced fueling value from table 80 will be transmitted by the logic module to reduce the fueling command to the fueling system 40. This reduced fueling command has the effect of reducing engine speed and power, thereby reducing the speed of the turbine 24 to a safe level. The routine can return at step 74 to re-evaluate the engine operating condition to determine whether the fueling values from the modified fueling table 80 are still to be used.

In accordance with the present invention, the fueling values for each pressure ratio-engine speed combination are calibrated to reduce the fueling only as much as is necessary to bring the turbocharger wheelspeed within its limits. The specific fueling values $F_i$ can be developed to maintain as high a power output as possible without compromising the safety of the turbocharger. Since the present invention relies upon the compressor pressure ratio, the engine would be derated only when absolutely necessary. Thus, on one hand, using the pressure ratio as a criterion eliminates the possibility of derating an engine that is not experiencing a turbocharger overspeed condition. On the other hand, the present invention also eliminates the risk of not derating an engine that is actually experiencing excessive turbocharger wheelspeed.

Figures 3, 4:
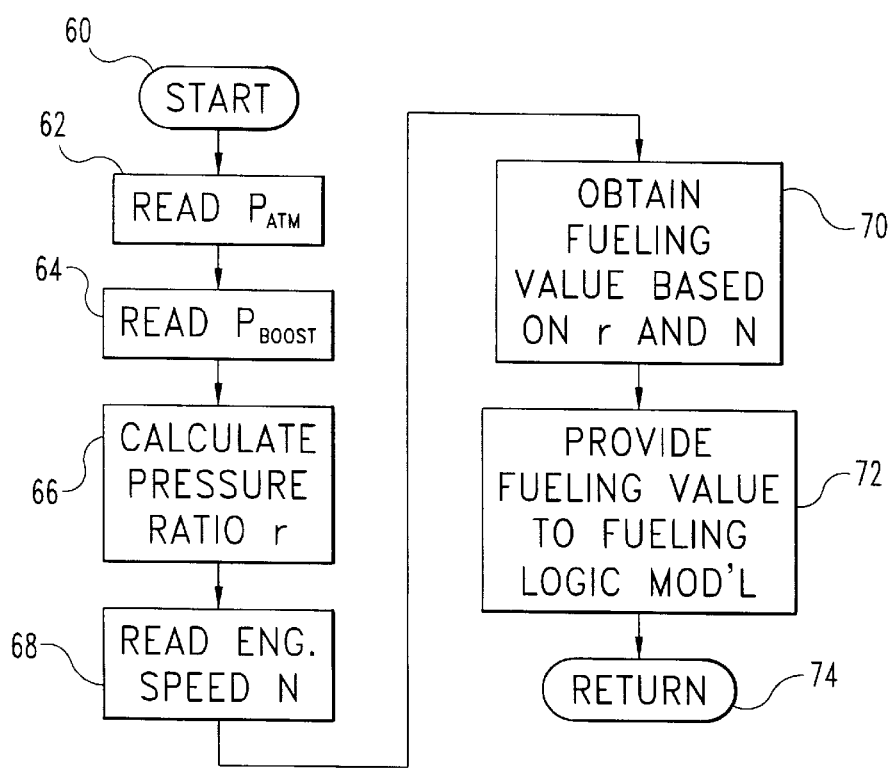
FIG. 3 is a table of fueling commands of a prior art system based upon engine speed and turbocharger boost pressure.
FIG. 4 is a flowchart of steps implemented according to one method of the present invention.

Using the typical fueling protocol, as represented by the table 57 of FIG. 3, the fueling value will typically increase with increasing boost pressure and decrease with increasing engine speed. With the present invention, lower fueling values may be generated for a particular boost pressure if the turbocharger pressure ratio and engine speed falls within section 84 of the table 80. On the other hand, the fueling values in section 84 of the table may be higher for a corresponding boost pressure and engine speed than the values obtained from the standard fueling table 57. The fueling values in table 80 of the present invention are intended to constitute limiting fueling values sufficient to prevent turbocharger overspeed. For instance, the fueling value for a particular engine speed and high boost pressure combination may equal 180.0 mm$^3$/stroke. At a highest attainable pressure ratio, say 4.0, the fueling value for the particular engine speed may be 200.0 mm$^3$/stroke, which is greater than the calibrated fueling value for the engine. In this instance, the inventive fueling table 80 will not lead to a modification in the fueling command that would otherwise be issued by the fueling logic module 43.

On the other hand, at a greater boost pressure, the standard fueling value for the particular engine speed may be 220.0 mm$^3$/stroke. Using the limiting value above, 200.0 mm$^3$/stroke, for the highest pressure ratio, the fueling logic module would apply the lower fueling value generated by the system and method of the present invention.

It may be appreciated that the present invention provides a system and method for protecting a turbocharger from an overspeed condition. An excessive wheelspeed could be the result of a wastegate failure, although other causes of an overspeed condition would be addressed by the invention.

It can also be appreciated that the application of the table 80 is essentially temperature independent. One difficulty with many standard fueling algorithms is that the intake manifold temperature affects the required fueling amount. While, the intake air manifold pressure and the ambient pressure are temperature dependent, the turbocharger pressure ratio, as used by the present invention, is not.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected.

As one example, those skilled in the art will recognize that the table 80 of FIG. 5 may alternatively be replaced with equations (discrete, continuous or piecewise continuous), graphs or other functions operable to map engine speed, and turbocharger pressure ratio to appropriate fuel limit values.

What is claimed is:

1. An engine control system for an internal combustion engine having a turbocharger driven by engine exhaust and providing a pressurized charge of air to the engine intake manifold, comprising:

a fuel system operable to supply fuel to the engine in response to a fueling signal;

a control computer operable to generate nominal fueling signals according to a nominal operating condition for the engine;

means for determining the pressure ratio of the turbocharger and providing a pressure ratio signal corresponding thereto;

means for determining engine speed and providing an engine speed signal corresponding thereto; and means for reducing the rotational speed of the turbocharger by generating modified fueling signals, different from said nominal fueling signals, as a function of said pressure ratio signal and said engine speed signal.

2. The engine control system according to claim 1 wherein:

said control computer includes a first table stored therein mapping engine speed values and boost pressure values to values for said nominal fueling signals;

said means for limiting includes a second table stored within said control computer mapping turbocharger pressure ratio values and engine speed values to values for said modified fueling signals; and said control computer further includes means for selecting the lesser of said nominal fueling values and said modified fueling values to provide to said fuel system.

3. The engine control system according to claim 1, wherein said means for determining the pressure ratio of the turbocharger includes:

an ambient pressure sensor providing an ambient pressure signal;

a boost pressure sensor disposed in the intake manifold downstream of the turbocharger and providing a boost pressure signal; and a pressure ratio calculation module operable to calculate said pressure ratio from said ambient and boost pressure signals.

4. The engine control system according to claim 3, wherein said pressure ratio calculation module is operable to apply a correction factor to said ambient pressure signal and to said boost pressure signal prior to calculating said pressure ratio.

5. For an engine having a turbocharger with a wastegate device and a fuel system operable to supply fuel to the engine in response to a fueling signal, the turbocharger driven by the exhaust gas from the engine and providing a compressed charge of air to the engine intake manifold, an engine control system for protecting the turbocharger in the event of a failure of the wastegate device, comprising:

a control computer operable to generate nominal fueling signals according to a nominal operating condition for the engine;

a calculation module operable to determine the pressure ratio of the turbocharger and provide a pressure ratio signal corresponding thereto;

an engine speed sensor operable to provide an engine speed signal corresponding thereto; and means for reducing the rotational speed of the turbocharger by generating modified fueling signals, different from said nominal fueling signals, as a function of said pressure ratio signal and said engine speed signal.

6. The engine control system according to claim 5 wherein:

said control computer includes a first table stored therein mapping engine speed values and boost pressure values to values for said nominal fueling signals;

said means for limiting includes a second table stored within said control computer mapping turbocharger pressure ratio values and engine speed values to values for said modified fueling signals; and said control computer further includes means for selecting the lesser of said nominal fueling values and said modified fueling values to provide to said fuel system.

7. The engine control system according to claim 5, wherein said means for determining the pressure ratio of the turbocharger includes:
   an ambient pressure sensor providing an ambient pressure signal;
   a boost pressure sensor disposed in the intake manifold downstream of the turbocharger and providing a boost pressure signal; and
   a pressure ratio calculation module operable to calculate said pressure ratio from said ambient and boost pressure signals.

8. The engine control system according to claim 7, wherein said pressure ratio calculation module is operable to apply a correction factor to said ambient pressure signal and to said boost pressure signal prior to calculating said pressure ratio.

9. A method protecting a wastegated turbocharger of an internal combustion engine in the event of a failure of the wastegate device, comprising the steps of:
   sensing engine speed and providing an engine speed signal corresponding thereto;
   sensing a boost pressure of the compressed air charge provided by the turbocharger to the engine, and providing a boost pressure signal corresponding thereto;
   sensing an ambient air pressure and producing an ambient air pressure signal corresponding thereto;
   calculating a turbocharger pressure ratio from the boost pressure signal and the ambient air pressure signal, and producing a pressure ratio signal corresponding thereto; and
   limiting fuel supplied to the engine as a function of the engine speed signal and the pressure ratio signal, whereby the engine exhaust flow rate is reduced to thereby reduce the rotational speed of the turbocharger.

10. The method of claim 9 wherein:
    fuel is supplied to the engine under nominal operating conditions according to a first table mapping engine speed and boost pressure to nominal fueling signal values; and
    the step of limiting fuel supplied to the engine includes;
       obtaining a reduced fueling signal value from a second table mapping engine speed and turbocharger pressure ratio to reduced fueling signal values; and
       selecting the lesser of the nominal fueling signal values and the reduced fueling signal values to provide to the engine.

* * * * *

UNITED STATES PATENT AND TRADEMARK OFFICE
CERTIFICATE OF CORRECTION

PATENT NO. : 6,155,050
DATED : December 5, 2000
INVENTOR(S) : Michael P. Blanz et al.

Page 1 of 1

It is certified that error appears in the above-identified patent and that said Letters Patent is hereby corrected as shown below:

Title page,
Item [73] -- Assignee: Cummins Engine Company, Inc., Columbus, Indiana. --

Signed and Sealed this

Twenty-eighth Day of August, 2001

Attest:

NICHOLAS P. GODICI
Attesting Officer
Acting Director of the United States Patent and Trademark Office